US 7,757,098 B2

(12) United States Patent
Brannock et al.

(10) Patent No.: US 7,757,098 B2
(45) Date of Patent: Jul. 13, 2010

(54) METHOD AND APPARATUS FOR VERIFYING AUTHENTICITY OF INITIAL BOOT CODE

(75) Inventors: Kirk D. Brannock, Hillsboro, OR (US); Antonio S. Cheng, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1037 days.

(21) Appl. No.: 11/479,167

(22) Filed: Jun. 27, 2006

(65) Prior Publication Data

US 2008/0022108 A1    Jan. 24, 2008

(51) Int. Cl.
H04L 9/00     (2006.01)
G06F 21/00    (2006.01)

(52) U.S. Cl. .......................... 713/187; 713/2; 713/189

(58) Field of Classification Search ............... 713/1, 713/2, 187, 189, 176
See application file for complete search history.

(56) References Cited

U.S. PATENT DOCUMENTS 6,138,236 A * 10/2000 Mirov et al. ................. 726/26
6,571,335 B1 * 5/2003 O'Donnell et al. .......... 713/173
6,832,311 B2 * 12/2004 Morisawa ..................... 713/1
6,938,164 B1 * 8/2005 England et al. ............. 713/193
6,986,042 B2   1/2006 Griffin
6,988,250 B1   1/2006 Proudler et al.
7,318,150 B2   1/2008 Zimmer et al.
7,484,099 B2   1/2009 Bade et al.
2002/0023212 A1   2/2002 Proudler
2002/0026576 A1   2/2002 Das-Purkayastha et al.
2003/0037231 A1   2/2003 Goodman et al.
2005/0268079 A1 * 12/2005 Rothman et al. ............... 713/1
2006/0010326 A1   1/2006 Bade et al.
2006/0075223 A1   4/2006 Bade et al.

OTHER PUBLICATIONS

USPTO, "Non-Final Office Action", U.S. Appl. No. 11/479,415, Mailed Oct. 1, 2009, Whole Document.

* cited by examiner

Primary Examiner—Gilberto Barron, Jr.
Assistant Examiner—Hadi Armouche
(74) Attorney, Agent, or Firm—Blakely, Sokoloff, Taylor & Zafman LLP

(57) ABSTRACT

A programmable processor initializes its state, then computes and verifies a hash of a boot code region of memory before executing any user instructions in the memory. Systems using similar processors, and software to control such a processor's operation, are also described and claimed.

18 Claims, 5 Drawing Sheets

METHOD AND APPARATUS FOR VERIFYING AUTHENTICITY OF INITIAL BOOT CODE

FIELD

The invention relates to trusted computing. More specifically, the invention relates to methods for confirming the validity of computer instruction sequences prior to executing the instructions.

BACKGROUND

Many computer systems process sensitive, confidential and/or valuable information such as medical or financial records, proprietary business data, and licensed multimedia content. The software that runs on these systems is often subject to attack by parties who wish to obtain greater access to the information than they would ordinarily be permitted. In other circumstances, the object of a software attack is simply to obtain greater control over the system hardware itself. An example of the latter situation is a general-purpose computer that is restricted to executing software licensed by the manufacturer (this often occurs in the context of game consoles). The manufacturer may sell such a system at a loss, intending to recover the lost revenue through the sale of game software. However, customers may purchase the machine and subvert the restrictions to get a capable, general purpose computer at an attractive price.

Current methods of controlling acceptable uses of information in a system and/or acceptable uses of the system itself include cryptographic verification of software executing on the machine. Programs may be checked and verified before execution to ensure that the user has not tampered with them, and one verified program can transfer control to another verified program, thus extending a chain of trust or establishing a "trust boundary." Unfortunately, current systems are unable to establish a chain of trust that encompasses every instruction executed by the system. Instead, software that executes early in the system boot process (often a Basic Input/Output System, or "BIOS," stored in a read-only memory) is implicitly trusted, and serves as a root of trust for subsequent programs. However, BIOS instructions may be subverted relatively easily (for example, "mod chips" are available to remove software restrictions from game consoles). Other attacks may also target similar implicitly-trusted software modules.

New approaches to software verification may permit the establishment of stronger trust chains and place more system functionality within a trust boundary to hinder or prevent the unauthorized use of information and/or system resources.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention alter the normal reset sequence of a programmable microprocessor to perform a cryptographic verification of a block of memory before executing any instructions from the memory.

Note that contemporary programmable processors execute sequences of instructions selected by a programmer (or generated by a compiler from a program written in a higher-level language). However, complex processor operations performed in response to a single instruction may actually be implemented within the processor by a sequence of simpler instructions. These simpler instructions are often called "micro instructions," and may not be documented or available for use by a programmer (except in the sense that an instruction selected by the programmer may cause a sequence of micro instructions to be executed). Micro instructions may also be used to perform processor housekeeping tasks such as reset processing, that are not directly linked to an instruction in a program. In this Specification, instructions that a programmer (or compiler) can use to form a program will be called "user instructions," while instructions that the processor executes internally to implement the programmable state machine described in the processor's documentation will be called "micro instructions."

Figure 1:
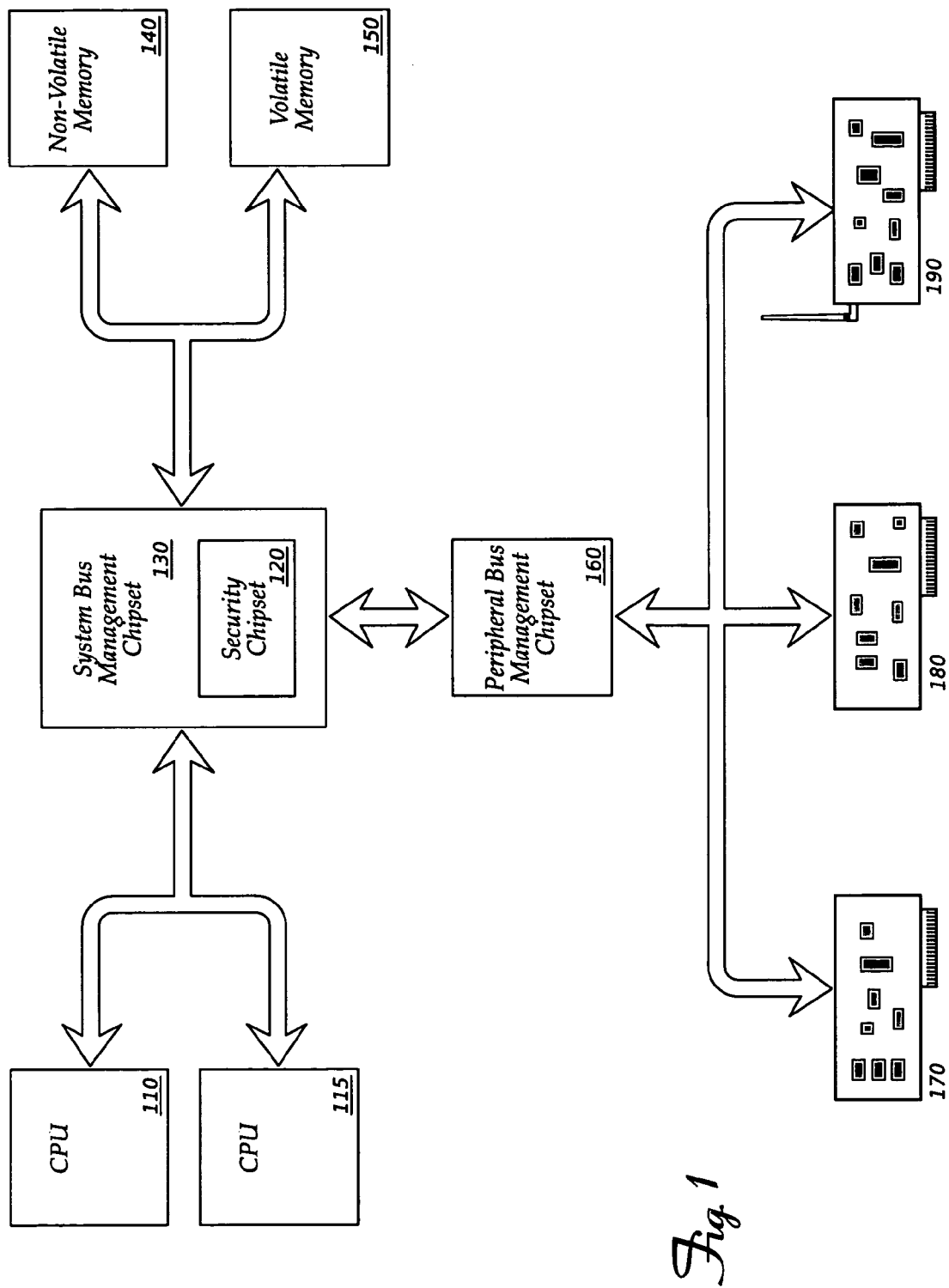
FIG. 1 shows some components of a data processing system that implements an embodiment of the invention.

FIG. 1 shows a representative data processing system configuration where an embodiment of the invention can be deployed. Elements 110 and 115 are programmable processors, or central processing units ("CPUs"). Embodiments may be used with uniprocessor and multiprocessor systems. Communication between CPUs 110, 115 and other system components such as non-volatile memory 140, volatile memory 150, and peripheral devices 170, 180 and 190 may be mediated by bus management chipsets such as system bus management chipset 130 and peripheral bus management chipset 160. CPUs 110, 115 may obtain cryptographic information used in various embodiments from a register in security chipset 120, which may be integrated into another chipset such as system bus management chipset 130 (as shown in this figure).

Figure 2:
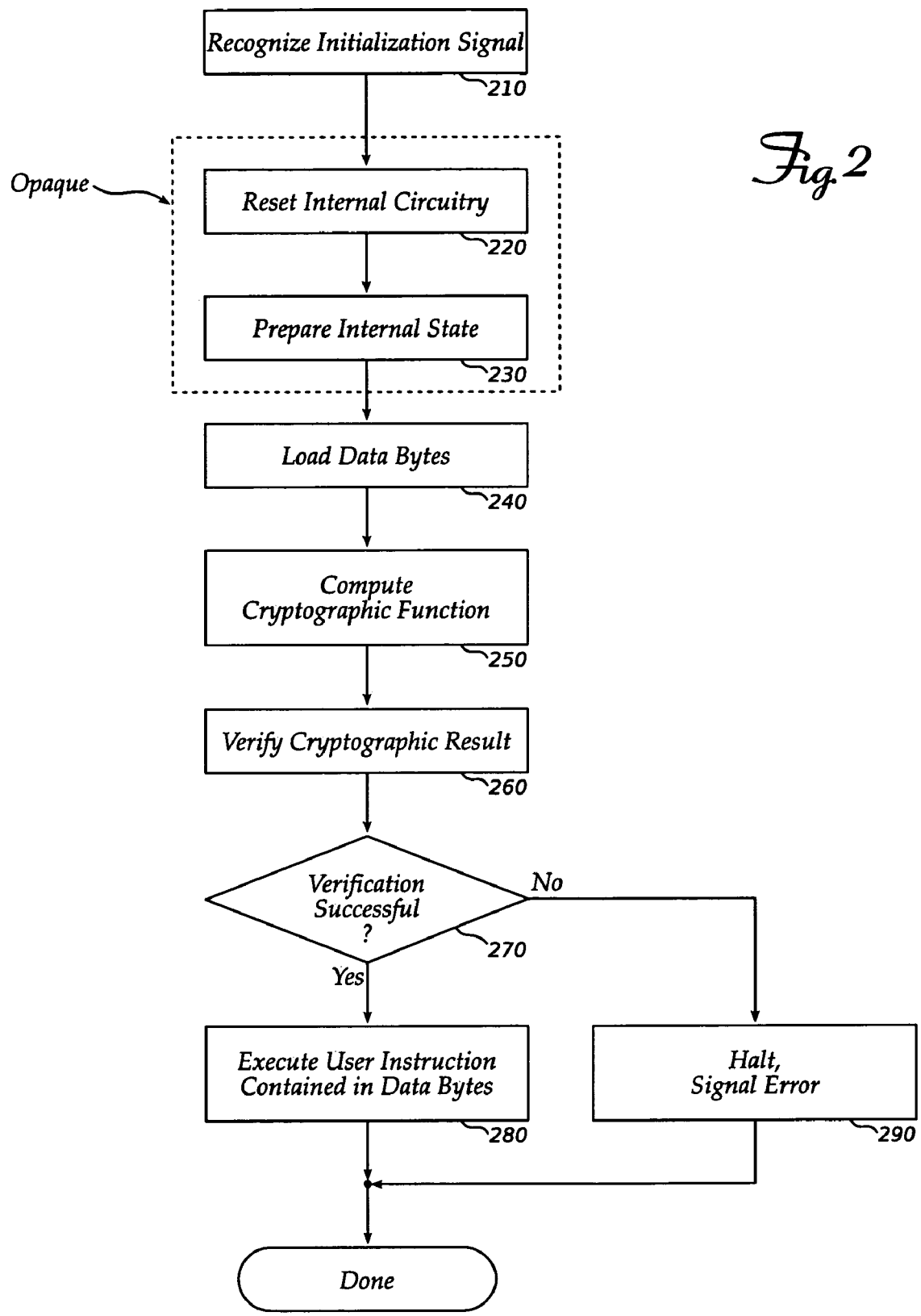
FIG. 2 is a flow chart of operations according to a basic embodiment.

FIG. 2 outlines a process used by some embodiments of the invention to extend the system's trust boundary to include all user code executing in a system like that shown in FIG. 1. First, the processor recognizes an initialization signal (210). The signal may be part of a power-up process that occurs when the system is turned on, a reset signal generated by a reset button, a timeout signal from a watchdog timer, or a similar event that indicates that the system should initialize itself to a known state and begin a start-up process. Some processors provide a "sleep" mode that offers reduced power consumption or other benefits. The signal or mechanism for recovering from sleep mode is another initialization signal that could be recognized according to an embodiment of the invention. Such a "wake up" signal could cause the processor to restore its state to the conditions prevailing when the processor went to sleep, or simply to a known state (like a reset state) that can be distinguished from a true reset state by examining a processor register.

Some of the processor's internal circuitry may be reset directly by the initialization signal (220), while other internal state may be prepared by internal processor microcode that begins to execute in response to the initialization signal (230).

Note that operations 220 and 230 may be opaque to observers outside the processor. The processor may or may not give any indication that it is performing reset processing, and may or may not exchange data or control signals with external system components. What is important to embodiments of the invention is that during initialization, no user instructions are retrieved and executed by the processor.

After initialization, a prior art processor might retrieve a user instruction from a predetermined location in memory and execute the instruction, or load an address ("vector") from a predetermined location and begin executing user instructions found at that address. However, according to an embodiment of the invention, the processor loads a plurality of data bytes located at a predetermined location (240) and computes a cryptographic function of the data bytes (250).

The cryptographic function may be a one-way, cryptographically secure hash function according to an algorithm such as the Secure Hash Algorithm ("SHA") or Message Digest ("MD"). A hash function can reduce an arbitrary number of data bytes to a single value (often a 128, 256, 512-bit or larger number) called a hash value. A hash has the property that any change to the data bytes gives a different hash value, and the one-way property of cryptographically secure hash functions implies that it is computationally infeasible to construct a chosen sequence of data bytes that have a particular known hash value. Note that many encryption algorithms can be operated as one-way hash functions, but algorithms such as SHA and MD may be preferred because they are widely-recognized standards and can process data bytes quickly.

Next, the cryptographic result (e.g. a hash value) of the computing operation is verified (260). Verification may entail comparing the result to an expected value stored, for example, in security chipset 120 shown in FIG. 1. In some embodiments, the expected value may be fixed in the processor itself, or stored in a non-volatile memory of the system or another tamper-resistant location. Due to the properties of the cryptographic function, the verification can detect tampering or corruption of the plurality of data bytes that were loaded and processed through the function. Some embodiments may perform additional verification by testing a cryptographic signature of the expected value to confirm that the expected value itself was not corrupted or tampered with.

Finally, if the cryptographic result was successfully verified (270), a user instruction contained in the data bytes that were loaded and verified is executed (280). This user instruction is the first user instruction to be executed by the processor after it recognizes the initialization signal. (If the cryptographic result cannot be verified, the processor may halt and signal an error condition (290). This permits the system to avoid executing instructions that could not be verified.) The general process of cryptographically verifying data in memory after a reset or initialization operation and before executing a user instruction may be referred to as a secure boot process.

Figure 3:
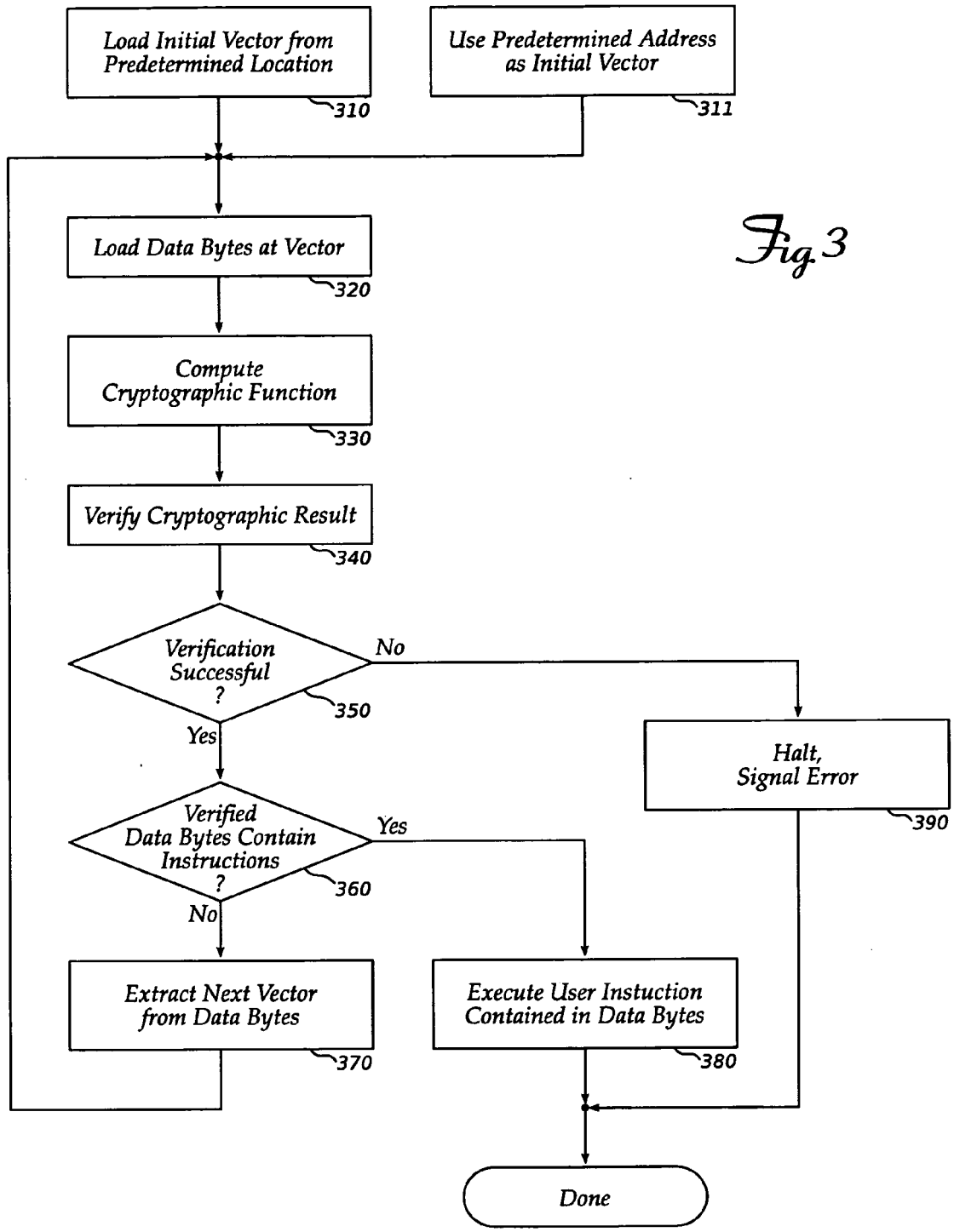
FIG. 3 is a flow chart of operations according to a more sophisticated embodiment.

FIG. 3 describes in greater detail the process of verifying data bytes before executing instructions contained therein. An embodiment operating as shown here may provide greater flexibility than the basic embodiment explained above.

After recognizing an initialization signal and performing any necessary state initialization (and before executing any user instructions), the processor loads an initial vector from a predetermined location in memory (310). (Alternatively, the processor could use a predetermined address as the initial vector (311).)

Next, data bytes in memory at the vector address are loaded (320) and a cryptographic function of the data bytes is computed (330). The cryptographic result of the function is verified (340). If the verification is successful (350), this embodiment examines information in the verified data bytes to determine whether the bytes contain user instructions (360). If the bytes do not contain instructions, a new address (vector) is taken from the data bytes (370) and the processor repeats the loading, computing, and verifying operations. If the verified data bytes do contain user instructions, the processor begins executing those instructions (380). If any of the verifications fail, the processor may halt and signal an error (390), as before.

Processor operations according to this embodiment permit the contents of several blocks or portions of memory to be verified before user instruction execution commences. Each block may point to one or more subsequent blocks to check, and either the pointer-containing block or the pointed-to block may specify whether the data in the block is to be treated as user instructions and executed if it is successfully verified. Each block may be verified according to a different cryptographic function or algorithm, and if desired, different cryptographic keys may be used to validate signatures on expected hash values. This permits "trust chaining," where a first block of data bytes may be verified against a signature from a key contained in the processor or in a security chipset, then a second block of data bytes may be verified against a signature from a key contained in the first block of data bytes. All verifications may be performed without executing any user instructions, and the provenance of any user instructions eventually executed can be traced back through the trust chain if desired. Once the initial block or blocks of memory have been verified as described here, the processor begins executing user instructions in one of the blocks. Those instructions may in turn validate subsequent instruction sequences and data structures before executing the instructions or using the data. This permits the trust chain (which, according to an embodiment of the invention, is rooted within the processor) to be extended arbitrarily.

Figure 4:
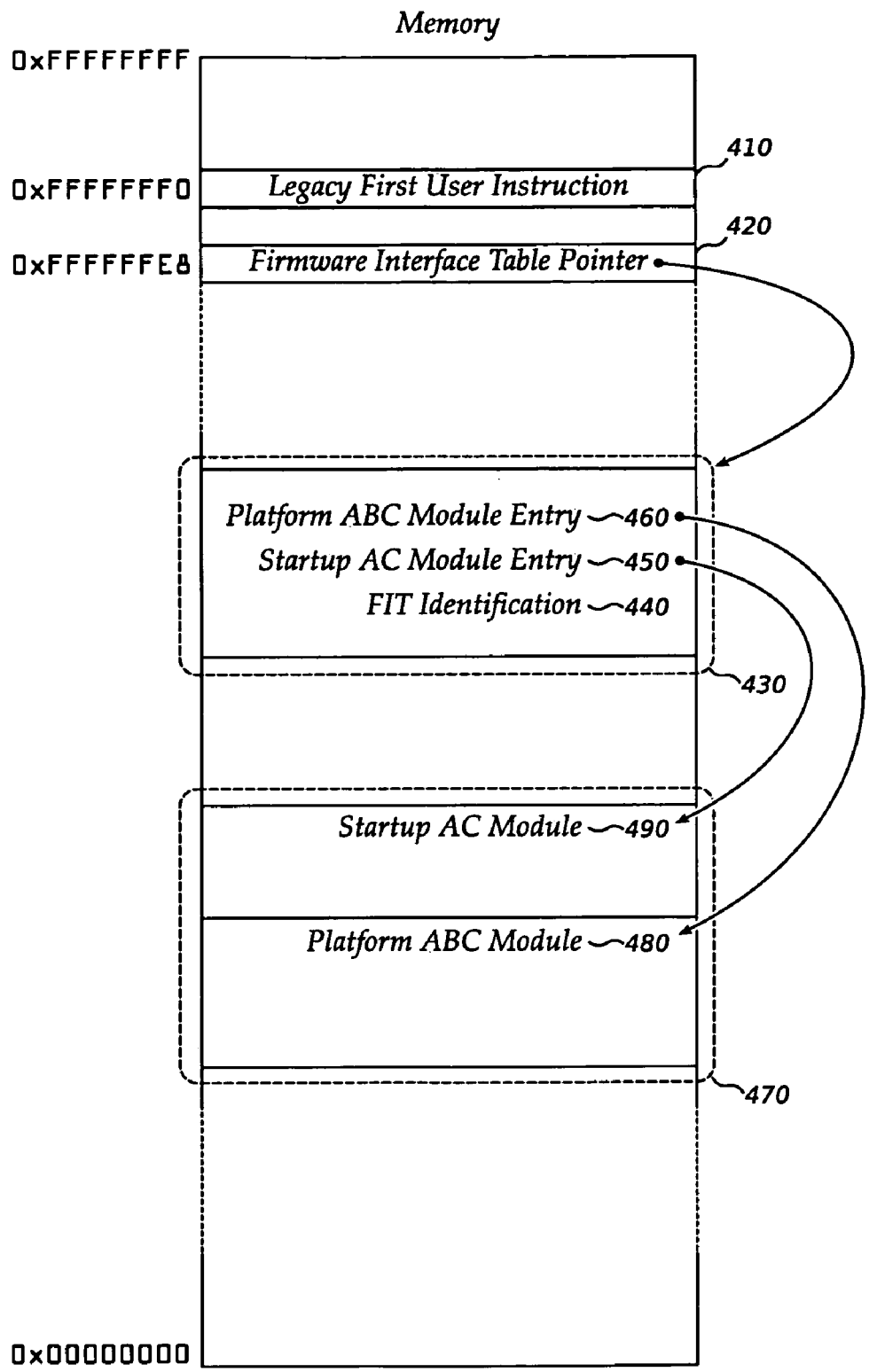
FIG. 4 is a block diagram of portions of a processor's memory, according to an embodiment of the invention.

The ability of the verification logic to examine multiple blocks of memory, linked by indirect pointers, without executing any user instructions fetched from the memory, permits BIOS code and related data structures to be arranged in memory as shown in FIG. 4. (Note that the BIOS code and data structures are likely to be stored in a non-volatile memory such as a read-only memory ("ROM") or a Flash memory.) FIG. 4 shows the locations of some relevant portions of a processor's memory. Element 410 (shown at address 0xFFFFFFF0) is the first user instruction executed by a prior-art programmable processor. A system that uses an embodiment of the invention may have a data structure such as Firmware Interface Table ("FIT") 430, whose address is stored at a predetermined location 420. The FIT 430 may contain entries including a FIT identification 440 to permit an embodiment of the invention to confirm that the data structure is valid. "Module entry" structures in the FIT may identify other portions of memory 470 that contain data and/or instructions to be processed as described above. (Of course, "processing" instructions is different from executing them: embodiments of the invention treat both data and instructions as plain data bytes over which a cryptographic hash is computed.)

In this Figure, Startup Authenticated Code ("AC") Module Entry 450 indicates a location and length of Startup AC Module 490, and Platform Authenticated BIOS Code ("ABC") Module Entry 460 indicates a location and length of Platform ABC Module 480. Data structures such as the FIT itself and the module entries may contain other elements (not shown) to specify version numbers, revision dates, or other useful information. As described with reference to FIGS. 2 and 3, embodiments of the invention locate one or more memory areas and verify the contents of those areas before executing any user instructions.

Figure 5:
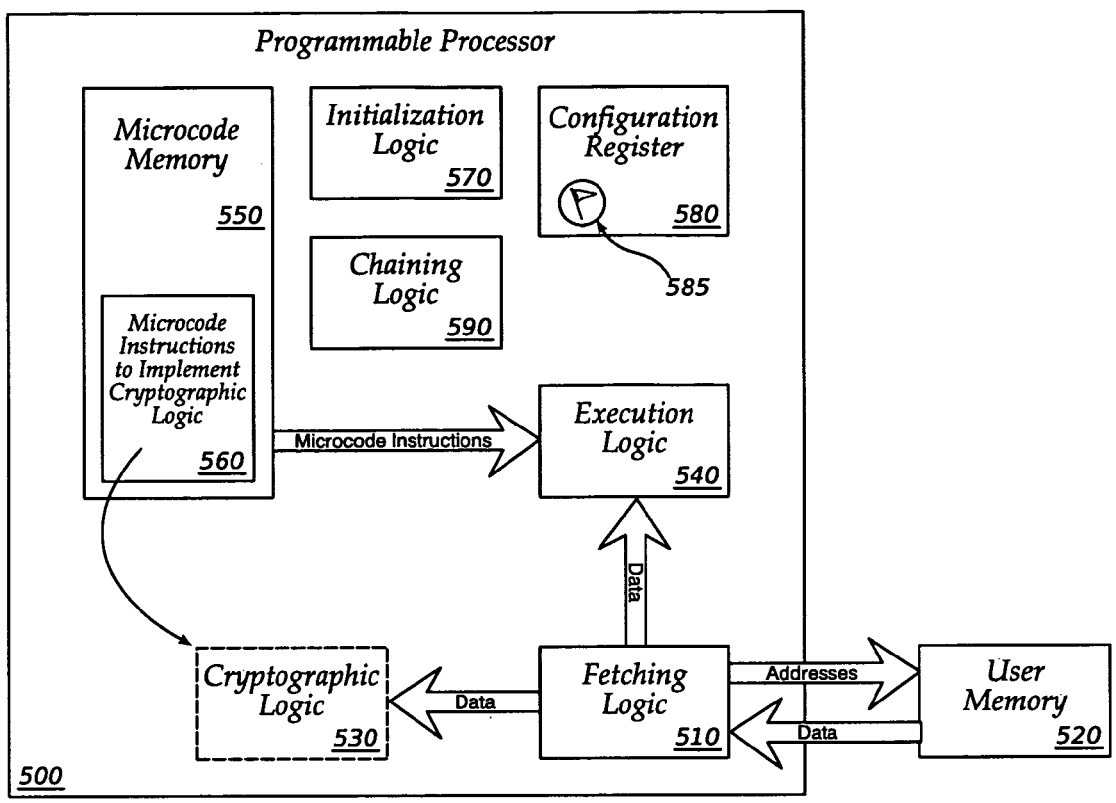
FIG. 5 is a block diagram of components and subsystems in a programmable processor, according to one embodiment of the invention.

FIG. 5 is a block diagram of components and subsystems that may be present in a programmable processor 500 according to an embodiment of the invention. Fetching logic 510 permits the processor to transmit addresses to, and receive data corresponding to those addresses from, user memory 520. Some processors will include a cache unit (not shown) to speed memory access. Data fetched from user memory 520 may be provided to cryptographic logic 530, which computes cryptographically secure, one-way functions (hashes) of the data and verifies the cryptographic results as described above. If verification is successful, data fetched from user memory 520 is given to execution logic 540, which executes the data as one or more user instructions.

An embodiment may implement cryptographic logic 530 as a dedicated circuit, or may instead contain a microcode memory 550 containing microcode instructions to perform various processor functions. For example, FIG. 5 shows microcode instructions 560 that may be executed by execution logic 540 to perform the functions of cryptographic logic 530. Embodiments may contain initialization logic 570 to recognize initialization signals and to reset the processor state and invoke cryptographic logic 530. Like cryptographic logic 530, the functions of initialization logic can also be implemented by microcode instructions stored in microcode memory 550. Chaining logic 590 (which may also be implemented by microcode instructions) can coordinate the operations of fetching logic 510 and cryptographic logic 530 to validate data in multiple regions of user memory before executing user instructions in any region, as described with reference to FIG. 3.

A configuration register 580 may be provided to control aspects of the processor's operation. For example, the configuration register may be programmed during manufacturing or testing to indicate a maximum clock speed of the processor, to enable or disable special functions, and so on. Some bits of the configuration register may reflect the state of electrical connections to the processor, so that a system integrator can provide additional information to subsystems of the processor and/or software executing on the processor. Configuration register 580 may contain a control flag 585 (shown here as a flag icon, but likely implemented as a binary digit) to enable or disable secure boot operations according to an embodiment of the invention.

An embodiment of the invention may be a machine-readable medium having stored thereon instructions which cause a programmable processor to perform operations as described above. In other embodiments, the operations might be performed by specific hardware components that contain hard-wired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that extension of the trust perimeter to include the first instructions executed after an initialization event can also be achieved by software and hardware that distribute the functions of embodiments of this invention differently than herein described. Such variations and implementations are understood to be captured according to the following claims.

We claim:

1. A method comprising:
    initializing a state of a programmable processor;
    computing a preliminary cryptographic function of a preliminary plurality of data bytes;
    verifying a preliminary cryptographic result associated with computing the preliminary cryptographic function;
    locating a next plurality of data bytes via an address within the preliminary plurality of data bytes if the preliminary cryptographic result is successfully verified;
    computing a cryptographic function of the next plurality of data bytes;
    verifying a cryptographic result associated with computing the cryptographic function; and
    executing a user instruction if the cryptographic result is successfully verified, wherein the user instruction is executed after initializing the state of the programmable processor and before any other user instruction is executed.

2. The method of claim 1, wherein the plurality of data bytes is located at a fixed memory address.

3. The method of claim 1, further comprising:
    obtaining a cryptographic key from a chipset register for verifying the cryptographic result.

4. The method of claim 1, wherein computing the cryptographic function comprises:
    computing a hash of the plurality of data bytes according to a Secure Hash Algorithm ("SHA") or a Message Digest algorithm.

5. The method of claim 1, further comprising:
    recognizing a reset signal, wherein the initializing operation is undertaken in response to the reset signal.

6. The method of claim 1, further comprising:
    entering a low-power state; and
    leaving the low-power state, wherein the initializing operation is to restore a state of the programmable processor that was in existence when the low-power state was entered.

7. An apparatus comprising a processor including:
    a fetching logic to retrieve a first plurality of data bytes from a user memory;
    a cryptographic logic to compute a first hash of the data bytes without executing a user instruction from the user memory;
    a chaining logic to control the fetching logic and the cryptographic logic and to retrieve a second plurality of data bytes from the user memory and to compute a second hash of the second plurality of data bytes, the second plurality of data bytes located at an address contained in the first plurality of data bytes; and
    an execution logic to execute a user instruction from the user memory if the first and the second hashes are valid.

8. The apparatus of claim 7, further comprising:
    an initialization logic to reset a state of the apparatus after an initialization event and to invoke the cryptographic logic after the initialization event.

9. The apparatus of claim 7, further comprising:
    a microcode memory to contain microcode instructions, wherein the execution logic is operable to implement the cryptographic logic by executing the microcode instructions.

10. The apparatus of claim 7, further comprising:
a configuration register to store a secure boot flag, wherein the cryptographic logic is operable to operate if the secure boot flag matches a predetermined value.

11. The apparatus of claim 7, wherein the fetching logic is operable to retrieve the plurality of data bytes from a fixed address in the user memory.

12. The apparatus of claim 7, wherein the user instruction consists of data bytes of the plurality of data bytes.

13. A system comprising:
a programmable processor including a boot code authentication logic;
a memory; and
a security chipset, wherein the boot code authentication logic is operable to:
obtain a cryptographic key from the security chipset, and
validate at least two plurality of bytes in the memory with the cryptographic key before executing a user instruction from the memory, wherein an earlier of the at least two pluralities contains an address of a later of the at least two pluralities.

14. The system of claim 13, further comprising:
a system bus management chipset including the security chipset.

15. The system of claim 13, wherein the memory is a non-volatile memory.

16. A machine-readable medium containing instructions that, when executed by a programmable processor, cause the programmable processor to perform operations comprising:
initializing a state of the programmable processor;
retrieving a plurality of data bytes from a user memory;
calculating a hash of the plurality of data bytes;
verifying the hash;
repeating the retrieving, calculating and verifying operations at least once, wherein an address of the plurality of data bytes for a current iteration is contained within the plurality of data bytes for a preceding iteration; and
executing a user instruction contained within the plurality of data bytes for a final iteration.

17. The machine-readable medium of claim 16, wherein an address of the plurality of data bytes for a first iteration is fixed.

18. The machine-readable medium of claim 16, wherein the hash is one of a Secure Hash Algorithm ("SHA") or a Message Digest.

* * * * *